US007924904B2

(12) United States Patent
Gaikwad et al.

(10) Patent No.: US 7,924,904 B2
(45) Date of Patent: Apr. 12, 2011

(54) RF BAND CLOCK SPUR HARMONIC CANCELLER

(75) Inventors: Rohit Gaikwad, San Diego, CA (US); Jason Alexander Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 1255 days.

(21) Appl. No.: 11/250,371

(22) Filed: Oct. 17, 2005

(65) Prior Publication Data
US 2006/0093019 A1    May 4, 2006

Related U.S. Application Data

(60) Provisional application No. 60/618,791, filed on Oct. 15, 2004, provisional application No. 60/672,049, filed on Apr. 18, 2005.

(51) Int. Cl.
*H04B 1/707* (2011.01)
(52) U.S. Cl. .......................... 375/139; 375/130
(58) Field of Classification Search .................. 375/139, 375/130
See application file for complete search history.

(56) References Cited

U.S. PATENT DOCUMENTS

| 4,207,543 | A | * | 6/1980 | Izakson et al. ............... 333/17.1 |
| 4,885,587 | A | * | 12/1989 | Wiegand et al. ................ 342/14 |
| 5,687,735 | A | * | 11/1997 | Forbes et al. ................. 600/509 |
| 6,384,589 | B1 | | 5/2002 | Gumm et al. |
| 6,563,931 | B1 | * | 5/2003 | Soli et al. ...................... 381/318 |
| 6,570,864 | B1 | * | 5/2003 | Kim et al. ...................... 370/342 |
| 2002/0160734 | A1 | * | 10/2002 | Li et al. ...................... 455/245.1 |
| 2003/0040292 | A1 | * | 2/2003 | Peterzell et al. ............. 455/147 |
| 2003/0176173 | A1 | * | 9/2003 | Klemmer ................... 455/182.2 |

FOREIGN PATENT DOCUMENTS
WO    WO 00/25434    5/2000

OTHER PUBLICATIONS

Adaptive noise cancelling: Principles and applications Widrow, B. et al.; Proceedings of the IEEE vol. 63, Issue 12, Dec. 1975 pp. 1692-1716.*

* cited by examiner

*Primary Examiner* — Shuwang Liu
*Assistant Examiner* — Michael R Neff
(74) *Attorney, Agent, or Firm* — McAndrews, Held & Malloy, Ltd.

(57) ABSTRACT

A network device for cancelling spurs without affecting an incoming signal. The network device includes an estimator for estimating amplitude and phase of a spur over a predetermined period of time. The network device also includes processing means for freezing further estimation of the amplitude and phase of the spur, for cancelling for an estimated spur and for allowing incoming packets. The network device further includes subtracting means for subtracting the estimated spur from an incoming packet. The estimated spur is subtracted from the incoming packet without affecting incoming signals that are not part of the estimated spur.

22 Claims, 2 Drawing Sheets

RF BAND CLOCK SPUR HARMONIC CANCELLER

This application claims priority of U.S. Provisional Patent Application Ser. No. 60/618,791, filed on Oct. 15, 2004. The subject matter of the earlier filed application is hereby incorporated by reference.

BACKGROUND OF THE INVENTION

1. Field of the Invention

The present invention relates to a system and method for cancelling harmonics of a digital system clock frequencies when the harmonics are coupled with an incoming signal.

2. Description of the Related Art

In any digital integrated circuit or system there is typically a running digital clock. Non-linear effects in the system typically cause the base digital clock frequency to lead to harmonics of that clock frequency. For example, if the base clock sequence is 100 MHz, some processes on the chip may cause undesirable components of 10 to 20 harmonics that can occur at 1 MHz and 2 MHz respectively and 1 GHz and 2 GHz respectively from the 100 MHz clock. These undesirable harmonics are also known as spurs. In a particular system, one can accurately predict the exact frequencies of the spurs because of the known base clock and harmonic frequency.

In a fast band system, i.e., a system that is operating at a high frequency with a fast band signal around the center carrier frequency, the fast band signal is down converted to base band by a radio chip. A base band processor then processes the base band signal. Specifically, the base band signal is digitized and a digital signal processor processes the base band signal. The digital signal processor usually works the running digital clocks. Therefore, when the RF section and the digital section are put on the same chip, the incoming digitized signal and the clock signal can couple easily. As such, the digital clock may create spurs all the way up to the fast band systems region of operation. Therefore, at the input of an RF, a desired signal or packet will be coupled with the spur frequency. The desired signal is typically a spread out signal, for example, 20 MHz in bandwidth. The spur frequency, on the other hand, is a very narrow band which is determined by the harmonic of the clock frequency.

A typical method of suppressing harmonics or spurs is through the use of electrical isolation between the digital system clock and the RF circuitry. However, isolation is not completely successful, and the in-band spurs can create numerous problems including carrier detection problems such as false detection. Additionally, the spurs created by the harmonics can degrade the signal-to-noise ratio. As the signal-to-noise ratio decreases, there is usually a higher incidence of dropped packets.

SUMMARY OF THE INVENTION

According to one aspect of the invention, there is provided a network device for cancelling spurs without affecting an incoming signal. The network device includes an estimator for estimating amplitude and phase of a spur over a predetermined period of time. The network device also includes processing means for freezing further estimation of the amplitude and phase of the spur, for cancelling for an estimated spur and for allowing incoming packets. The network device further includes subtracting means for subtracting the estimated spur from an incoming packet, wherein the estimated spur is subtracted from the incoming packet without affecting incoming signals that are not part of the estimated spur.

According to another aspect of the invention, there is provided a method for cancelling spurs without affecting an incoming signal. The method includes the steps of estimating amplitude and phase of a spur over a predetermined period of time and freezing further estimation of the amplitude and phase of the spur. The method also includes the steps of cancelling for an estimated spur and allowing incoming packets. The method further includes the step of subtracting the estimated spur from an incoming packet, wherein the estimated spur is subtracted from the incoming packet without affecting incoming signals that are not part of the estimated spur.

According to another aspect of the invention, there is provided an apparatus for cancelling spurs without affecting an incoming signal. The apparatus includes estimating means for estimating amplitude and phase of a spur over a predetermined period of time and freezing means for freezing further estimation of the amplitude and phase of the spur. The apparatus also includes cancelling means for cancelling for an estimated spur and allowing means for allowing incoming packets. The apparatus further includes subtracting means for subtracting the estimated spur from an incoming packet, wherein the estimated spur is subtracted from the incoming packet without affecting incoming signals that are not part of the estimated spur.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

This invention therefore seeks to cancel harmonics through the use of estimation circuitry which is configured to remove the spur without affecting the signal. According to an embodiment of the inventive system, since the clock frequency is known, it is relatively easy to determine exact frequencies of the spurs relative to the channel carrier frequencies. For example, if the clock frequency is 80 MHz and if the center RF frequency is 2.412 GHz, it is possible to determine that the in-band harmonics will occur at 2.416 GHz. In a wireless communication scenario such as, for example, 802.11g, there are 14 different channels or "slices" of the 2.4 GHz band. Using the example of an 80 MHz digital clock frequency, the harmonics for each of the 14 channels can easily be determined, and appropriate estimation and filtering may be applied to remove the spurs.

Figure 1:
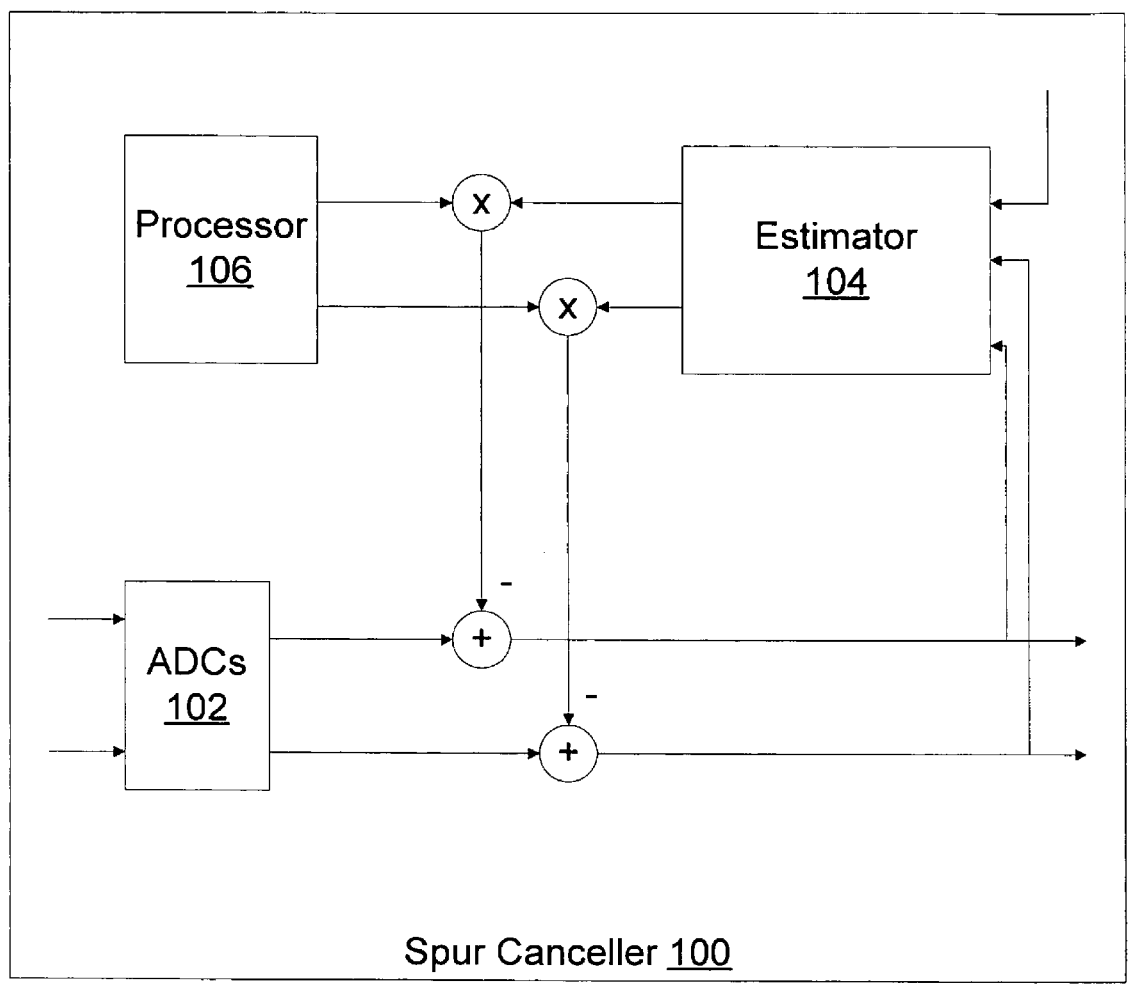
FIG. 1 illustrates a spur canceller 100 in which the embodiments of the invention may be implemented.

FIG. 1 illustrates a spur canceller 100 in which the embodiments of the invention may be implemented. Spur canceller 100 is used to estimate the magnitude and the phase of the spur frequency and to cancel the spur frequency without affecting an incoming packet. Spur canceller includes ADCs 102, an estimator 104 and a processor 106. According to an embodiment of the invention, at the input to the digital section of spur canceller 100, after ADC 102, the basedband signal is digitized and the spur is to be cancelled. Although the frequency and harmonics of the digital clock are already known, to cancel the spur without affecting the signal, one must determine the amplitude and phase of the signal.

According to an embodiment of the invention, estimator 104 performs an estimation of the spur's amplitude and phase over a short period of time in the absence of incoming signals/packets. The estimation of the spur amplitude and phase may be repeated over a period of time. For every time step, the estimation, $A_k$, is obtained according to the following formula:

$$A_{k+1} = A_k - \mu \cdot \partial [e_k^H \cdot e_k] / \partial A_k$$

$$A_{k+1} = (1-\mu) \cdot A_k + \mu \cdot e^{i \cdot 2 \cdot \pi \cdot k \cdot f0/fs} \cdot x_k$$

wherein $A_k$ is the estimation of the spur amplitude and phase;

$x_k$ is the incoming signal;

$e^{i \cdot 2 \cdot \pi \cdot k \cdot f0/fs}$ is an exponential of the harmonic at the frequency, $f_0$;

fs is the sampling frequency;

$\mu$, a register variable for adjusting the tracking rate of the spurl.

After obtaining an initial estimation, processor 106 multiplies the initial estimation by $e^{i \cdot 2 \cdot \pi \cdot k \cdot f0/fs}$, which is an exponential of the harmonic at the frequency, $f_0$. At some time thereafter, processor 106 subtracts the product from $x_k$, an incoming signal.

Specifically, estimator 104 tracks the signal within a narrow band of energy, $f_0$. As such, estimator 104 is a narrow adaptive filter that only lets in energy at the spur harmonic, $f_0$, and blocks out all other energy. Thus, when the estimation is being performed, no signal energy is allowed to enter estimator 104, only spur energy is allowed to enter estimator 104. This provides a good estimation of the spur, even in the presence of noise since only the noise at the spur frequency is allowed to enter the filter.

As mentioned above, estimation of the spurs can occur, for example, at a time when there are no packets being transmitted or received, i.e., in the absence of signal. As is known to one skilled in the art, the spurs will exist in the absence of a signal since the digital clock is running on the substrate. As is also known to those skilled in the art, every packet reception is followed by a period of silence which allows estimator 104 to estimate the amplitude and phase of the spur in the absence of a signal. After estimating the spur amplitude and phase, spur canceller 100 freezes the estimation. Thereafter, spur canceller 100 starts cancelling for the spur. Once a packet is received, spur canceller 100 subtracts the estimated spur from the packet. Since the packet is expected to have the effect of the spur as it comes into ADCs 102, a correct estimation and subtraction would result in spur cancellation without affecting the incoming packet information at the same frequency as the spur.

While the spur amplitude and phase may be estimated in the absence of incoming signal, it is difficult to guarantee the absence of a signal during the estimation. As is known to those skilled in the art, one may rely on higher network directives, such as gaps between packets to determine the absence of signal; however, this method may be error prone. Therefore, in embodiments where there are no means of estimating the spur amplitude and phase in the absence of a signal, estimator 104 may estimate the amplitude and phase of the spur all the time at the same adaptive rate. As such, there is no initial estimation of the spur amplitude and phase. Therefore, during cancellation, spur canceller 100 will always notch out energy at the spur frequency. Even though in this embodiment the portion of the signal at the same frequency as the spur will also be notched out, it should be noted that the signal loss is minimal.

The above discussion assumes that there is no change in the gain in an RF front end where the signal is down converted from fast band to baseband and gained up appropriately. Currently, if there is a small incoming signal, the RF front end gains it up so that ADCs 102 can see the full range of the signal and if the signal is too large, it attenuates the signal properly so that it fits within the ADC range. In situations where there is a change in gain as packets are received on the front end, the estimation must be updated to reflect the gain changes. According to the embodiment outlined above, before the packet enters spur canceller 100 and the gain is determined, estimator 104 has already estimated the amplitude and phase of the spur and the spur canceller 100 is already cancelling for the spur. When the packet enters spur canceller 100, from the preamble of the packet, spur canceller can determine the appropriate gain for the packet and automatically apply the gain to the packet. The gain changes are determined by the packet received strength. It should be noted that if the desired signal strength changes, the gain for the spur will also change. As such, estimator 104 has to account for the gain change during packet reception. So if an estimate is based upon a level of, for example, 70 dB, but the packet strength coming in is 30 dB, then the spur value will be lower and the estimation needs to be updated to reflect this change in signal strength. As such, in this embodiment of the invention, spur canceller 100 adjusts the estimated component by the gain delta from when the intial estimation occurred to the packet gain that is being applied to the packet.

During gain change, the phase response may also change. Thus, to determine the phase change, spur canceller 100 runs amplitude and phase estimation during the packet reception with a slow $\mu$, a variable for tracking the spur. In an embodiment of the invention, spur canceller 100 starts tracking the spur over the packet slowly. From the preamble to the payload portion of the packet, spur canceller 100 can track out what the phase of the packet was and determine the phase change.

One can imagine that after the initial estimation of the amplitude and phase of the spur, there can be a gain change in the front end. To account for this, spur canceller 100 may continue to run estimator 104 at a slow adaptive rate of $\mu$. It should be noted that the adaptive rate of $\mu$ may be zero if necessary. So that as the gain and phase change, the estimator 104 will update and hopefully only track the gain and phase from the spur and not the signal energy.

Figure 2:
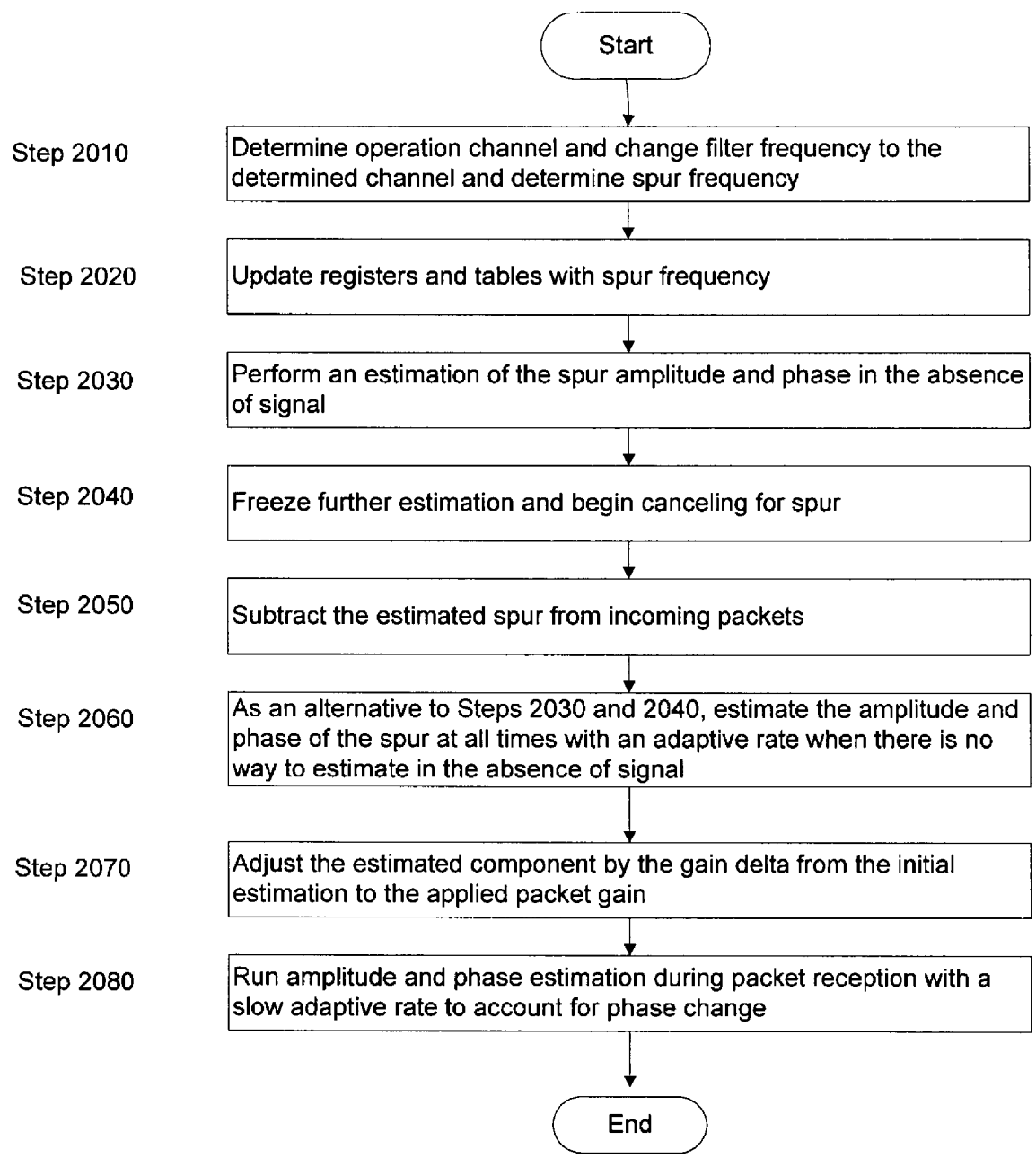
FIG. 2 illustrates the steps implemented in embodiments of the invention.

Embodiments of the above mentioned invention may be implemented in an RF-Baseband integrated chip. FIG. 2 illustrates the steps implemented in carrying out the above mentioned invention. As mention above, in 802.11g, for example, there are 14 different channels or "slices" with different center frequencies in a 2.4 GHz band, for example 2.412 MHz to 2.480 MHz. In order to implement the embodiments of the invention, in Step 2010, the channel on which operation is occurring should be determined and the filter frequency of the RF band should be changed to the determined channel. Thereafter, whether or not there will be a spur at the signal bandwidth based on the digital system clock and harmonic should also be determined and, if there is a spur, the spur frequency should also be determined. In Step 2020, upon determining the spur frequency, the appropriate registers and tables must be updated with the determined spur frequency.

In Step 2030, estimator 104 performs an estimation of the spur's amplitude and phase over a short period of time and in the absence of signal. In Step 2040, spur canceller 100 then freezes the estimation and starts cancelling for the spur before allowing packets to enter. In Step 2050, once a packet is received, estimator 104 subtracts the estimated spur from the packet. In Step 2060, where there is no means of estimating the amplitude and phase of the spur in the absence of a signal, estimator 104 may estimate the amplitude and phase of the spur all the time at an adaptive rate. It should be noted that the tracking rate μ can possible be varied over the length of the packet. For example, there may be different tracking rates during silence period, preamble and payload/data portion of the packet. In Step 2070, spur canceller 100 may adjust the estimated component by the gain delta from when the estimation occurred to the packet gain that is being applied to the packet. In Step 2080, to determine the phase change, spur canceller 100 runs amplitude and phase estimation during the packet reception with a slow μ for tracking the spur. The steps above may be repeated after every packet or after a predetermined period of time. Since the spur strength can be a function of temperature on the substrate, if the temperature changes then the estimate of the spur amplitude and phase may be stale. Therefore, the predetermined period of time can be set to account for activities that may affect the estimate of the spur amplitude and phase.

In one embodiment, therefore, the invention includes a spur canceller having an estimator for estimating spur magnitude and a phase, and a subtracter for subtracting an estimated spur value from an incoming packet at an appropriate time. The invention can also include an updater for updating the estimation based upon the signal level of an incoming packet, to dynamically adjust for varying spur magnitudes. The invention can be applied to any configuration where a fixed clock signal is creating a harmonic or a spur on an adjacent circuit, and more particularly to be applied to wireless RF communications where a digital clock pulse is operating in conjunction with RF frequencies.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for cancelling spurs without affecting an incoming signal, the network device comprising:
   radio frequency (RF) circuitry that downconverts an RF analog signal into an analog baseband signal, the RF circuitry being disposed in an integrated circuit chip that includes a substrate;
   an analog-to-digital converter that converts the analog baseband signal into a digital baseband signal, wherein the digital baseband signal couples with a digital clock to create a spur at an undesirable harmonic frequency near a frequency of the RF analog signal, and wherein the RF analog signal undesirably couples with the spur;
   an estimator that estimates an amplitude and phase of the spur over a predetermined period of time, the spur being generated, at least in part, by the digital clock running on the substrate of the integrated circuit chip, wherein the estimator estimates the amplitude and phase of the spur in the absence of the digital baseband signal from the analog-to-digital converter, and wherein the estimate of the amplitude and phase of the spur is based on an iterative mathematical function that is mathematically based on a register value that adjusts a tracking rate of the spur;
   a multiplier that multiplies an output of the estimator with an output of a processor and that outputs an estimated spur; and
   a subtractor that subtracts the estimated spur output by the multiplier from the digital baseband signal output by the analog-to-digital converter.

2. The network device of claim 1, wherein the multiplier multiplies an initial estimation of the amplitude and phase of the spur by an exponential of the spur at a predetermined frequency to determine the estimated spur.

3. The network device of claim 1, wherein the estimator is a narrow adaptive filter that lets in energy at the spur frequency and blocks out all other signal energy.

4. The network device of claim 1, wherein the estimator estimates the amplitude and phase of the spur over a period of time at an adaptive rate.

5. The network device of claim 4, wherein the estimator comprises a notch filter that notches out all energy at the spur frequency.

6. The network device of claim 1, wherein the estimator repeats estimation of the amplitude and phase of the spur over a predetermined period of time.

7. The network device of claim 1, further comprising a gain controller that determines an appropriate gain for the incoming packet from a packet preamble, that automatically applies the gain to the packet, and that adjusts the estimated spur by a gain delta from when the estimation of the amplitude and phase of the spur occurred to a packet gain that is being applied to the packet.

8. The network device of claim 1, further comprising means for executing amplitude and phase estimation of the spur during packet reception with a slow adaptive rate for tracking the incoming packet to account for a phase change.

9. The network device of claim 1, wherein the estimator continuously estimates the amplitude and phase of the spur at a slow adaptive rate to track the incoming packet, wherein the estimator is able to track and update gain and phase changes from the estimated spur without affecting incoming signal energy.

10. A method for cancelling spurs without affecting an incoming signal, the method comprises the steps of:
   downconverting, by an integrated circuit radio frequency (RF) section on a substrate, an RF analog signal to an analog baseband signal;
   converting the analog baseband signal into a digital baseband signal, the digital baseband signal comprising incoming packets, wherein the digital baseband signal couples with a digital clock on the substrate to create a spur at an undesirable harmonic frequency near a frequency of the RF analog signal, and wherein the RF analog signal undesirably couples with the spur;
   iteratively estimates an amplitude and phase of the spur over a predetermined period of time, the spur being generated, at least in part, by the digital clock running on the substrate, wherein the estimating step comprises estimating the amplitude and phase of the spur in the absence of an incoming signal, and wherein the estimate of the amplitude and phase of the spur is mathematically based on a register value that adjusts a tracking rate of the spur; and
   subtracting the estimated spur from an incoming packet, wherein the estimated spur is a function of at least an exponential expression that includes at least one of a sampling frequency and a spur harmonic frequency.

11. The method of claim 10, wherein the estimating step comprises multiplying an initial estimation of the amplitude and phase of the spur by an exponential of the spur at a predetermined frequency to determine the estimated spur.

12. The method of claim 10, wherein the estimating step comprises estimating the amplitude and phase of the spur over a period of time at an adaptive rate.

13. The method of claim 10, wherein the estimating step comprises repeating estimation of the amplitude and phase of the spur over a predetermined period of time.

14. The method of claim 10, further comprising the steps of:
   determining an appropriate gain for the incoming packet from a packet preamble;
   automatically applying the gain to the packet; and
   adjusting the estimated spur by a gain delta from when the estimation of the amplitude and phase of the spur occurred to a packet gain that is being applied to the packet.

15. The method of claim 10, further comprising the step of executing the amplitude and phase estimation of the spur during packet reception with a slow adaptive rate for tracking the incoming packet to account for a phase change.

16. The method of claim 10, wherein the estimating step comprises continuously estimating the amplitude and phase of the spur at a slow adaptive rate for tracking the incoming packet and tracking and updating gain and phase changes from the estimated spur without affecting incoming signal energy.

17. The method of claim 10, wherein prior to the estimating step, the method comprises the steps of:
   determining an operation channel;
   changing a filter frequency of an RF band to a determined channel;
   determining a spur frequency at a signal bandwidth in the determined channel; and
   updating at least one register with the determined spur frequency.

18. In an integrated chip that downconverts a radio frequency (RF) analog signal into an analog baseband signal, an apparatus that cancels spurs that are generated, at least in part, by a digital clock running on a substrate of the integrated chip, the apparatus comprising:
   an analog-to-digital converter that converts an incoming analog baseband signal into a digital baseband signal, wherein the digital baseband signal couples with the digital clock to create a spur at an undesirable harmonic frequency near a frequency of the RF analog signal, and wherein the RF analog signal undesirably couples with the spur;
   an estimator that iteratively estimates an amplitude and phase of the spur when the analog-to-digital converter is not receiving the incoming analog baseband signal, wherein the estimator estimates the amplitude and phase of the spur in the absence of the digital baseband signal from the analog-to-digital converter, and wherein the estimate of the amplitude and phase of the spur is based on an iterative mathematical function that is mathematically based on a register value that adjusts a tracking rate of the spur;
   a multiplier that multiplies an output of the estimator with an output of a processor, the output of the processor comprising an exponential function that is a function of a sampling frequency and a spur harmonic frequency, the multiplier providing an estimated spur; and
   a subtractor that subtracts the estimated spur provided by the multiplier from the digital baseband signal provided by the analog-to-digital converter.

19. The apparatus according to claim 18, wherein the estimator starts cancelling the spur before receiving packets of the digital baseband signal.

20. The apparatus according to claim 18, wherein the estimator estimates the amplitude and phase of the spur over a period of time at an adaptive rate.

21. The apparatus according to claim 18, further comprising a gain controller that determines an appropriate gain for an incoming packet from a packet preamble, that automatically applies the gain to the packet, and that adjusts the estimated spur by a gain delta from when the estimation of the amplitude and phase of the spur occurred to a packet gain that is being applied to the packet.

22. The apparatus according to claim 18, wherein the estimator is a narrow adaptive filter that lets in energy at the spur frequency and blocks out other signal energy, or wherein the estimator comprises a notch filter that notches out energy at the spur frequency.

* * * * *